United States Patent [19]
Piotrowski

[11] 3,987,909
[45] Oct. 26, 1976

[54] TOOL STORAGE MECHANISM

[75] Inventor: Tadeusz Wiktor Piotrowski, Cincinnati, Ohio

[73] Assignee: Cincinnati Milacron, Inc., Cincinnati, Ohio

[22] Filed: Oct. 30, 1975

[21] Appl. No.: 626,972

[52] U.S. Cl. .............................. 214/1 BC; 29/568; 198/631; 198/796; 214/151
[51] Int. Cl.² ....................................... B23Q 3/157
[58] Field of Search .............. 214/1 B, 1 BA, 1 BC, 214/151; 198/19, 90, 95, 100, 124; 29/568

[56] References Cited
UNITED STATES PATENTS

| | | | |
|---|---|---|---|
| 2,974,811 | 3/1961 | Dammert et al. ................ | 214/1 BC |
| 3,200,492 | 8/1965 | Lehmkuhl ............................ | 29/568 |
| 3,312,370 | 4/1967 | Kolarich et al. ................ | 214/1 R X |
| 3,745,646 | 7/1973 | Kristiansson ........................ | 29/568 |
| 3,932,924 | 1/1976 | Anderson ........................ | 29/568 X |

*Primary Examiner*—Frank E. Werner
*Attorney, Agent, or Firm*—Thomas M. Farrell

[57] ABSTRACT

A tool storage mechanism comprising two independent chains drivingly secured about respective driving and driven pulley sets, wherein a plurality of tool storage pockets are carried on the links of said chains, and further wherein the chains are carried on a common pivotable plate, which is switchable between two preset angular positions about the pivot. When the pivotable plate is moved to position number 1, tool storage pockets on a first chain may be presented serially to a predetermined pickup point, wherein a tool changer can load or unload tools with the tool storage pocket. When the pivotable plate is positioned at position number 2, the second chain is switched to such position that its tool storage pockets may be presented serially with the tool pickup point.

4 Claims, 9 Drawing Figures

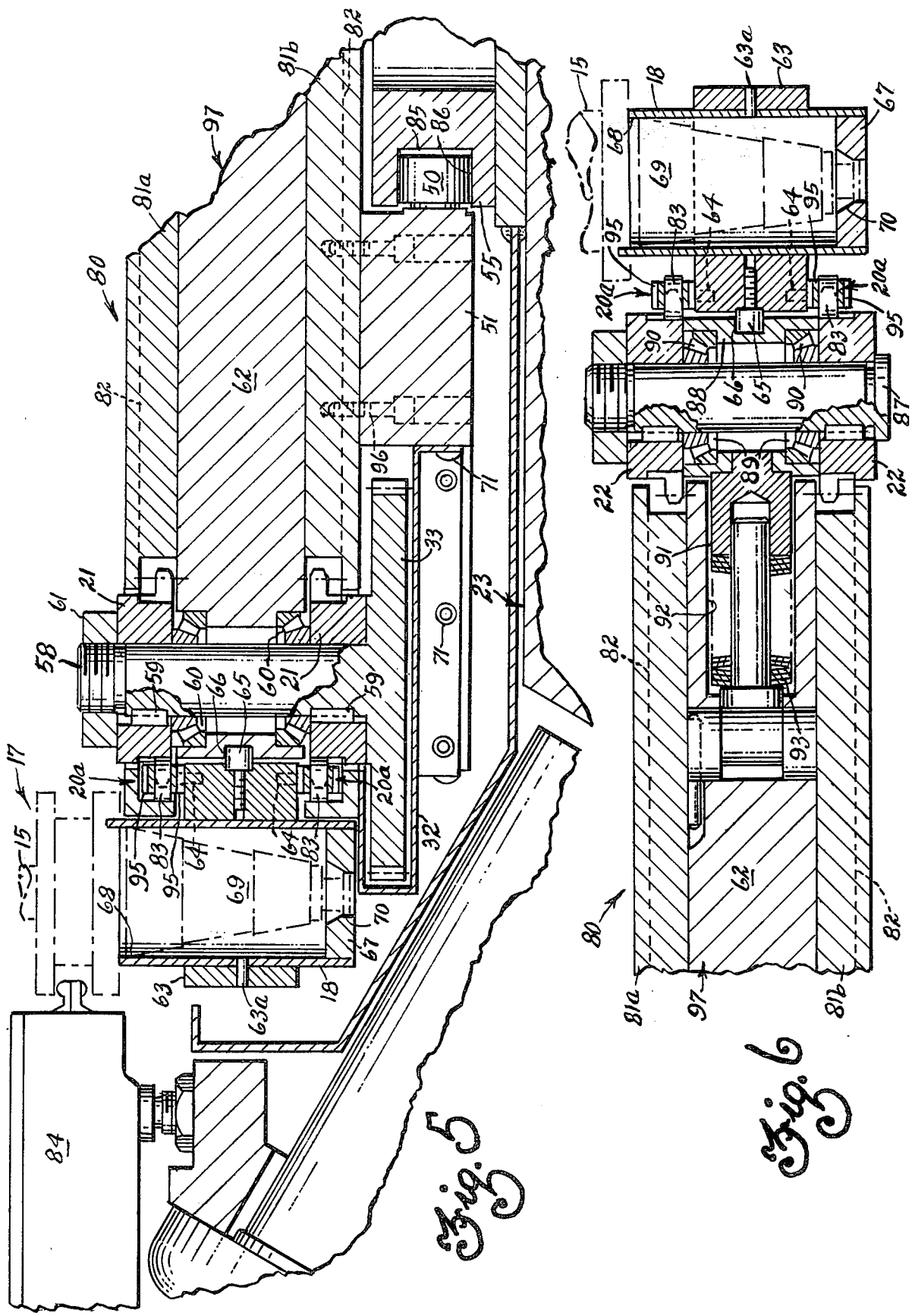

TOOL STORAGE MECHANISM

BACKGROUND OF THE INVENTION

In the machine tool field, automatic machining cycles have developed to such a point that the use of automatic tool changing devices to interchange tools from a machine tool spindle to a tool storage matrix, or reserve, has become rather commonplace. The continued use therefore of automatic tool changing devices has created a need and demand for increased tool storage capabilities and better means for containing a high density of tools.

Early tool storage matrices comprised elements such as a drum, looking like a "lazy susan," and having a plurality of tools along a circumference of a plate, oriented with tool axes parallel to the central axes of the rotatable plate. These prior art devices were limited because with increased tool density, the diameter of the tool storage plate grew accordingly. To obtain higher density packing, another type of tool storage matrix was developed which utilized a chain, wound in a serpentine fashion around driven and driving pulleys, wherein the tools were carried in tool pockets on the links of the chains. This type of device does promote a high density storage capability but increases the inertia of a tool storage system because of the mass which must be moved each and every time a new tool is to be selected. Further, tool changing time is increased because of the time that it takes for each and every tool to pass by a predetermined pickup point when it is desirable to change to tools.

Applicant feels through his design efforts, that he has achieved a tool storage matrix having the inherent good features of a chain device, yet one which provides an opportunity if so desired to decrease inertia seen by the tool indexing motor, and one which is capable of being operated faster when it is desired to present new tools and pockets to the predetermined part pickup position relative to the tool changer.

It is therefor an object of the present invention to provide a tool storage matrix for an automatic tool changing machine tool which has a high density tool packing within the machine envelope.

Another object of the present invention is to provide a tool storage matrix which may be quickly operated to present tools and tool pockets to a part interchange position.

SUMMARY OF THE INVENTION

The present invention comprises a machine tool having a planar surface mounted in a horizontal position on its topmost edge. The machine tool further has an automatic tool changer which is capable of receiving and depositing tools at a predetermined part pickup position on the machine planar surface.

A post is secured at a right angle to the planar surface of the machine tool, and a parallel plate is pivotally connected to the post and actuated along the plane of the plate from a first to a second position by means of a cylinder which may push and pull the plate to its positions.

Vertical driving shafts extend from the plate upward where a sprocket is received on the topmost end of each drive shaft, and a chain is disposed around each driving sprocket rearward along the plate surface to a pair of driven sprockets which are slidably received on the plate to provide tension to the chains when they are driven. A plurality of pockets are vertically disposed around the length of each chain having the pockets at the respective links of said chain, and further wherein the pockets are adapted to receive the common shanks of the variety of tools which may be used.

The drive sprockets of the two drive shafts are rotatably received in the plate and have power transmitted to them simultaneously by a gear train which is motivated by a power source carried by the plate.

When it is desired to select tools from a first chain which is capable of being indexed so as to present its respective tool pockets to the part pickup position on the planar surface of the machine tool, the gear train is motivated to induce an indexing movement to that chain. All tools on that first chain may thereafter be selectably positioned at the part pickup point without interference from the second chain tools.

When it is desired to select and exchange tools with the second chain, the plate is shifted to a preset second angular position about the pivot post, so that the tool pockets of the second chain may thereafter be serially presented to the parts pickup point and all tools on the second chain may be easily accessed without interference from the first chain. By this "shuttling" of the plate from the first position to the second position, the circuits of tools on a respective chain may be accessed quickly without running the entire plurality of both chains past the pickup point.

In this described mode, wherein both sprockets are driven simultaneously on the two independent chains, all the tools are moved around their respective circuit paths at the same time. However, it can be seen that through a slight modification a clutching means, or separate drive motors may be utilized wherein only one chain at a time is rotated through its circuit path.

BRIEF DESCRIPTION OF THE DRAWINGS

FIG. 5 is a longitudinal section taken along the line 5—5 of FIG. 2 showing a tool storage pocket at a part interchange position relative to a part transfer arm.

FIG. 6 is an elevational section taken along the line 6—6 of FIG. 2 showing a driven sprocket and chain tensioning means.

DESCRIPTION OF THE PREFERRED EMBODIMENT

Figure 1:
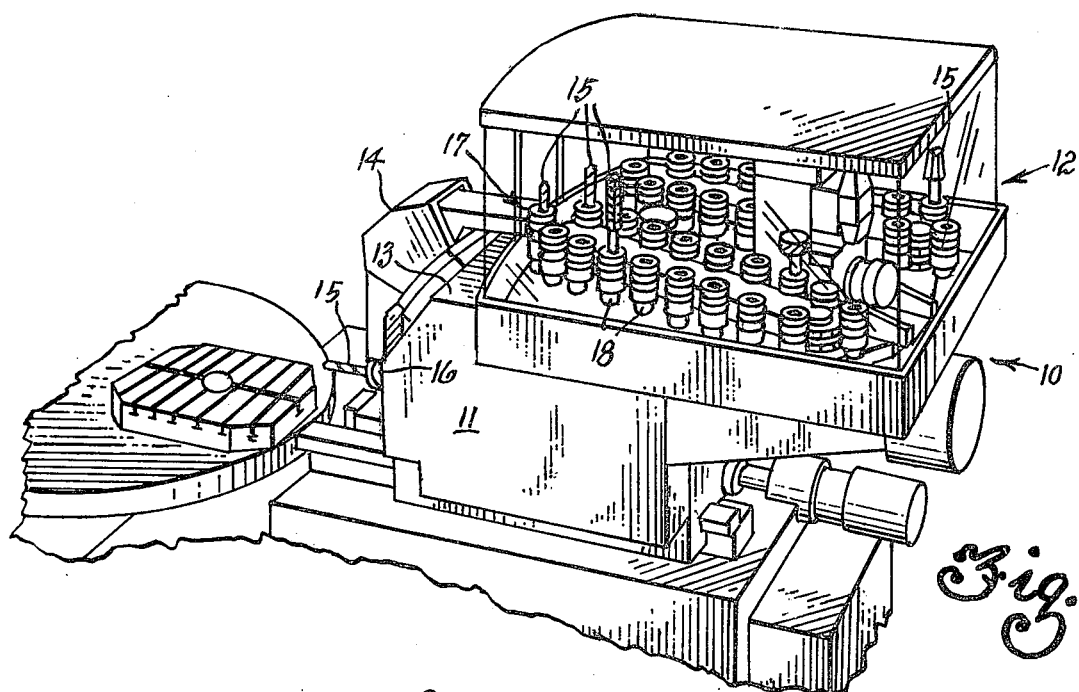
FIG. 1 is an isometric view of a machine tool having a tool head with a tool storage matrix mounted on its topmost end and further having an automatic tool changing mechanism adapted to transfer tools from the tool storage matrix to the work spindle.

Referring now to the drawings, and particularly to FIG. 1 thereof. There is shown a machine tool 10 having a tool head 11 with a tool storage mechanism 12 mounted on its topmost end 13 and further having an automatic tool changer 14 adapted to transfer tools 15 from the tool storage mechanism 12 to the work spindle 16 and the reverse. A plurality of tools 15 are shown in the tool storage mechanism 12 which may be presented serially to the tool pickup point 17.

Figure 2:
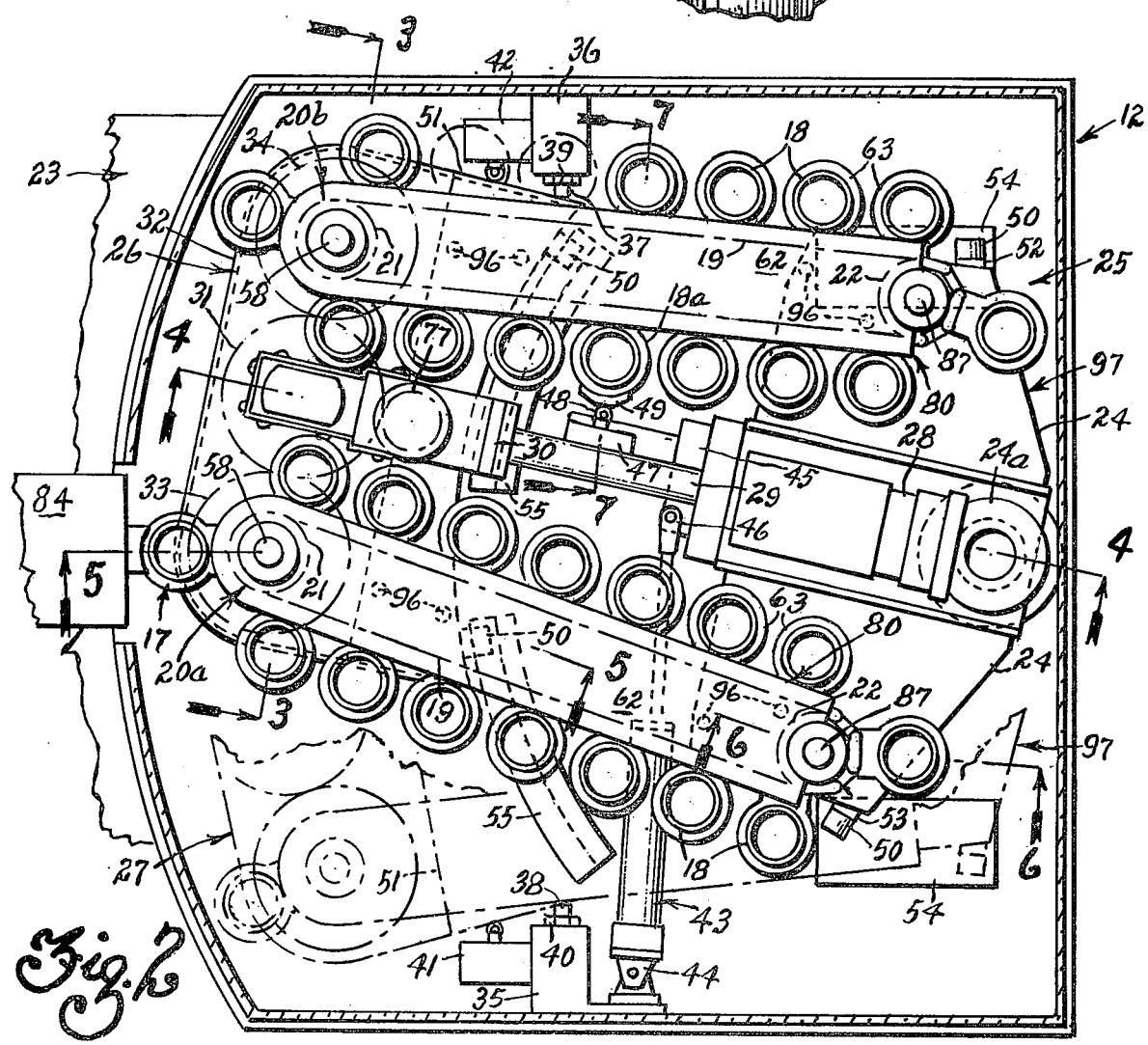
FIG. 2 is a plan view of a tool storage mechanism having tool storage pockets disposed along the pitch line of two chain circuits.

FIG. 2 shows the tool storage mechanism 12 of FIG. 1 wherein tool storage pockets 18 are carried along the pitch lines 19 of two chain circuits 20a,b, as the respective links thereof, and the chains are disposed around a driving pulley 21 and driven pulley 22 set for each chain. A horizontal planar surface 23 is shown on the topmost edge 13 of the machine tool 10, having a point 17 defined as the tool pickup position, and a tool carrier plate 24 is mounted parallel to the planar surface 23 and disposed such that it may pivot on a vertical pivot post 24a, so that the tool storage array 25 may be moved from a first position 26 (shown) to present the tools 15 of one chain 20a at the tool pickup position 17, to a second, phantom, position 27 whereby the tools of the other chain 20b may be presented to the tool pickup position 17.

The tool carrier plate 24 and roller mounting block 51 are secured to the chain support assembly by screws 96 to form a stable frame 97 for the tool storage mechanism 12.

A drive motor 28 is shown affixed to the tool carrier plate 24 having a drive shaft 29 extending into a drive housing 30 (part of block 51) wherein power is transmitted through a driving pinion 31 within the confines of a shield 32 fixed to the housing 30. The driving pinion 31 will engage driven pinions 33, 34 which are mounted to the bottom of the shafts of the driving pulley of the respective chain sets. In this manner, when an indexing motion is induced by the drive motor 28 each chain 20a, b will be moved through a preset index amount (but it may be seen that through slight modification, clutch means may be provided so that only one chain is moved at a time). Stop blocks 35, 36 are provided at each side of the frame 97 path with adjusting screws 37, 38 and nuts 39, 40 for fine positioning of the endmost position 26, 27 of the frame 97. Limit switches 41, 42 are adapted to the stop blocks 35, 36 to indicate that the frame 97 has reached a final position to either side of the machine tool head 11. A piston-cylinder set 43 is provided, having the cylinder secured through a clevis mounting 44 to one stop block 35, having its piston end clevis 46 mounted to a block 45 at the central portion of the frame 97 nearest the index motor 28, such that by introducing fluid pressure to alternate ends of the cylinder will cause the frame 97 to be pulled from position number 26 to position number 27 (shown in phantom), and the reverse.

A limit switch 47 is shown in the center of the frame 97 having its sensor 48 contacted by a cam surface 49 which is affixed to one tool pocket 18a for setup purposes. Rollers 50 are provided on the frame 97 to provide an anti-friction movement of the frame during its shuttle from a first position 26 to a second position 27. The rollers 50 are carried in respective roller mounting blocks, 51, 52, 53 and have their roller surfaces engaging hardened wear blocks 54, 55 which are secured to the machine planar surface 23.

Figure 3:
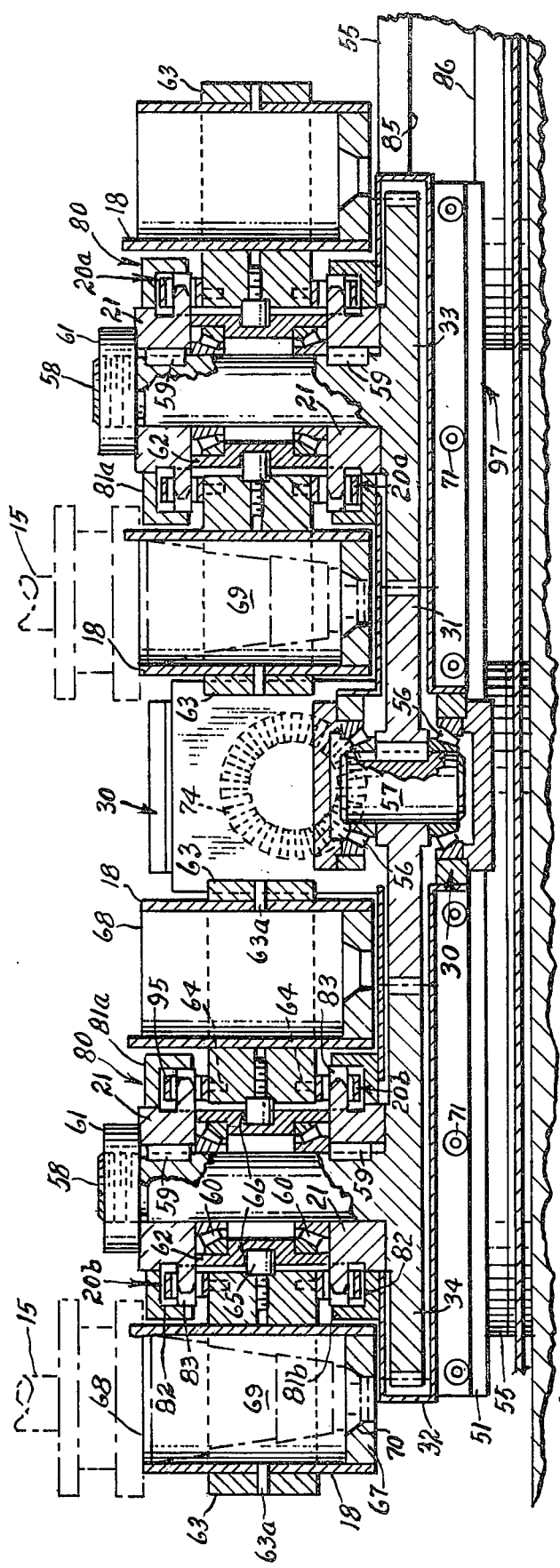
FIG. 3 is a transverse elevational section taken along the line 3—3 of FIG. 2 depicting chain carriers and drive shafts.

Referring to FIG. 3, the driving pinion 31 is shown mounted in bearings 56 on a shaft 57, to which is keyed the driving pinion 31. The driving pinion 31 is engaging driven pinion 33, 34 for each of the respective chains 20a,b. Since the mechanisms of the two chain circuits 20a,b are substantially identical, it will be necessary to discuss only the one while reference may be had to the other. The driving sprockets 21 are mounted as a pair, with one at the top of the shaft 58 and one at the bottom of the shaft 58 held by keys 59 while the shaft 58 is carried in a pair of anti-friction bearings 60 secured by a locknut 61 within the housing 62 which is secured to the frame 97. The tool pocket carrier 63 is pinned to the chain 20b by the link pivot pin 64. A support roller 65 is provided from the rearward portion of the tool pocket carrier 63 and the roller 65 is guided in a groove 66 for the entire length of the housing 62. The tool pocket 18 is a cylindrical shell having a closed bottom 67 and open top 68 to form a container for tool shanks 69. A bottom recess 70 is provided for additional stability of the tool shank 69. The pocket 18 is secured to the pocket carrier 63 by a pin 63a. The shield 32 is provided to cover the gear teeth of the pinion 34 and it is secured to the roller mounting block 51 and housing 30 by screws 71.

Figure 4:
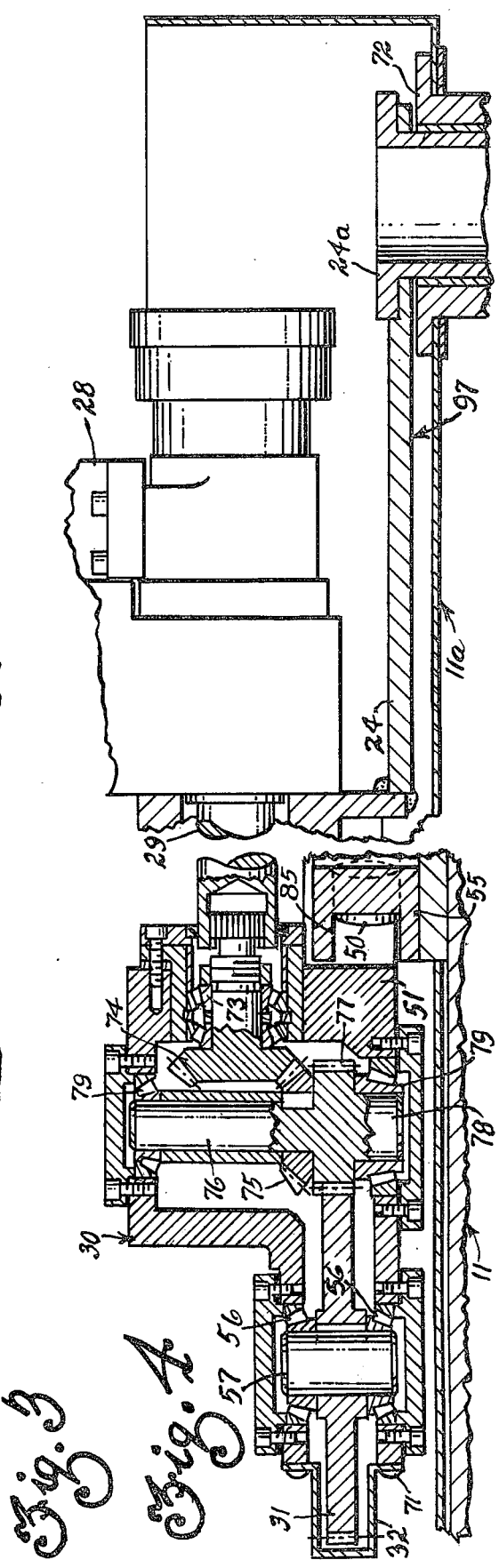
FIG. 4 is a longitudinal elevational section taken along the line 4—4 of FIG. 2 depicting a chain index mechanism.

FIG. 4 depicts the longitudinal section through the drive housing 30 showing the index motor 28, the plate 24, and the vertical pivot post 24a which is journaled in a suitable socket 72 on the tool head extension 11a for rotation relative thereto. In the frontmost end of the section, the drive shaft 29 of the motor 28 is extending through, and supported by anti-friction bearings 73 in the drive housing 30, wherein a first bevel gear 74 is provided in mesh with a vertically-mounted second bevel gear 75 to transmit the motion of the horizontal input shaft 29 to rotary motion of the vertically-mounted shaft 76. A pinion 77 forms part of the bottommost portion 78 of the vertically-mounted shaft 76 and the shaft 76 is carried in anti-friction bearings 79 such that it may be rotated to transmit torque to the driving pinion 77. Thereafter, driving pinion 77 torque is transmitted directly to the pinion 31.

FIG. 5 is a section taken through the chain support assembly 80 depicting the assembly 80 as a composite piece comprising in part, a central housing 62 within which is rotatably carried the shaft of the driven gear 33 and driving pulleys 21. A pair of blocks 81a,b are mounted on the top and bottom of the central core housing 62 within which are cut guide slots 82 so that the chain link rollers 83 may be contained. A tool pocket 18 is shown at a part pickup position 17 proximate to a tool changer arm 84 which has been introduced to that zone for the interchange of tools. On the bottom block 81b of the chain support assembly 80 is mounted a guide roller 50 and its associated block 51. The roller 50 is mounted with its axis horizontal and the roller 50 is carried in a hardened way block 55 having a U-groove 85 cut therein so that the roller 50 may be constrained from vertical movement, yet be permitted to rotate along on a hardened wear surface 86.

The section in FIG. 6 depicts a longitudinal section through the rear, driven pulleys 22 of the chain circuit 20a. Here it may be seen that the driven pulley 22 is carried on a driven shaft 87 which is rotatably mounted in a block 88 which has bores 89 provided and bearings 90 mounted therein for said purpose. A horizontal guide diameter 91 is provided on the pulley support block 88, extending into a hole 92 which has been provided in the central core housing 62 of the chain support assembly 80 so that when spring washers 93 are compressibly stacked within the hole 92, radial thrust will be provided against the driven pulleys 22 to apply tension to the chain circuit 20a.

Figure 7:
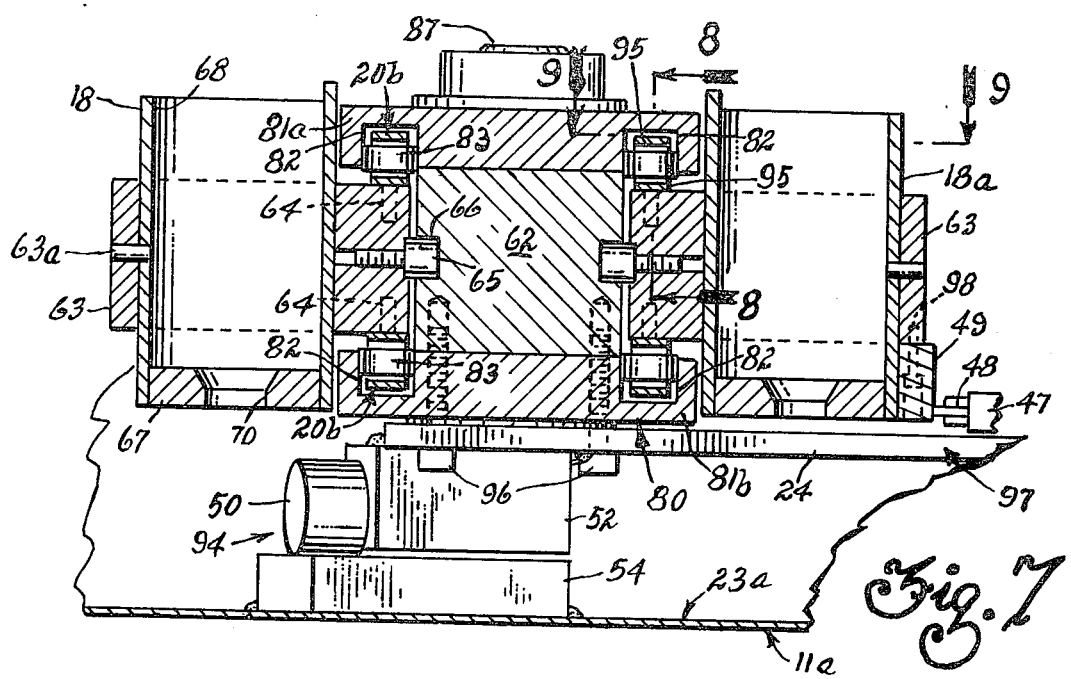
FIG. 7 is an elevational section taken along the line 7—7 of FIG. 2 depicting chain carriers and plate support roller.

FIG. 7 is a section through the tool pockets 18 and roller support assembly 94 showing that the chain link rollers 83 are guided in suitable way grooves 82 provided in the top and bottom blocks 81a,b to provide stability and guidance to the chain system while the central roller 65 are carried in the grooves 66 provided in the housing 62 section to provide vertical support for the tool. The tool carrier plate 24 is shown with a roller 50 mounted to a roller block 52 which is secured to the bottom of the plate 24. The roller 50 is mounted with its axis horizontal and is shown with the roller engaging a roller wear block 54.

Figure 8:
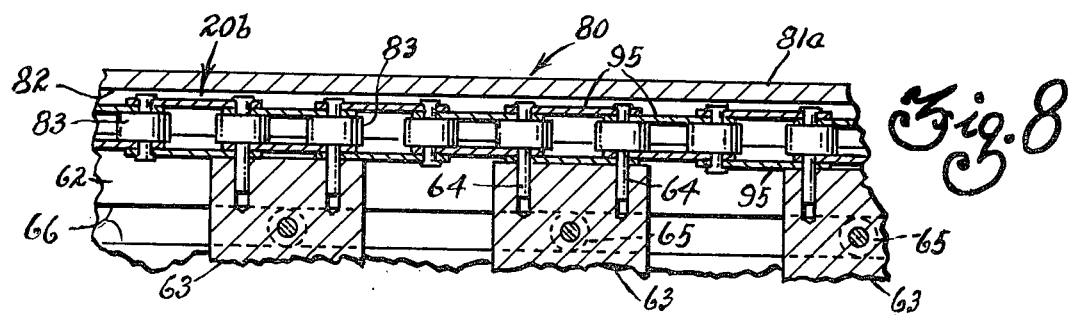
FIG. 8 is a section through chain linkage taken along the line 8—8 of FIG. 7.
Figure 9:
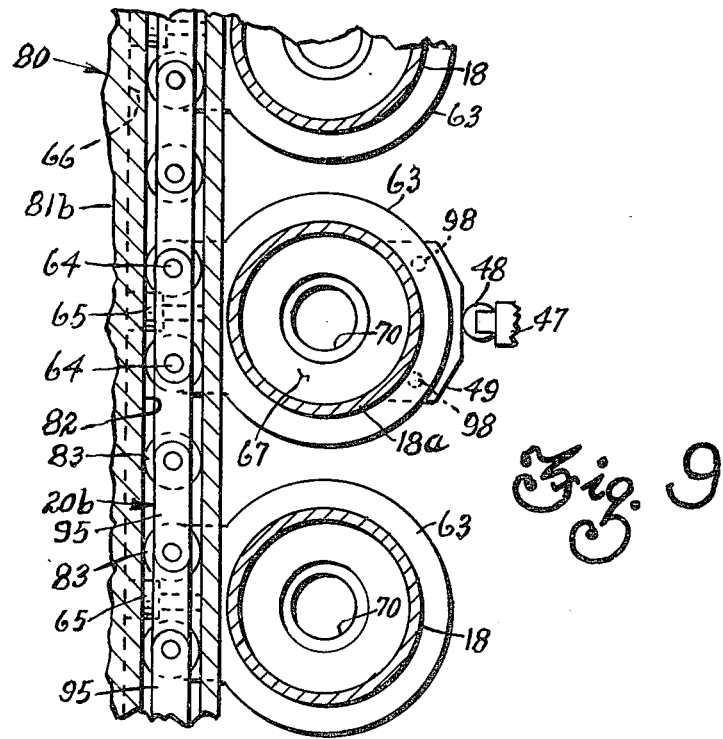
FIG. 9 is a plan section taken through chain linkage and tool storage pockets along the line 9—9 of FIG. 7.

The section of FIG. 8 shows a tool pocket carrier 63 pinned by the link pins 64 of the chain with the link pins 64 passing through the links 95 and the link rollers 83. The tool pocket support rollers 65 are shown in their respective support groove 66 to provide vertical support for the tool pocket carriers 63. The plan view of FIG. 9 further illustrates the link rollers 83, guide slot 82, and the respective links 95 as related to the tool pockets 18 and the setup cam 49 is shown affixed to one tool pocket 18a by screws 98 such that the cam will engage the sensor 48 of a switch 47 at a predetermined time for setup purposes.

What is claimed is:

1. In a machine tool employing a tool changer for the automatic interchange of tools between a machine spindle and a tool storage matrix, an improved tool storage mechanism, comprising in combination:

a. a tool carrier plate, pivotally supported on a pivot post which is fixed to a planar surface on said machine tool;
b. a pair of chain circuits, each respectively adapted to be carried by driven and driving shafts, wherein said shafts are rotatably mounted to said tool carrier plate so that said chain circuits will move in a plane parallel to said tool carrier plate;
c. a plurality of tool pockets carried as the links of said chain circuits, capable of receiving like tool holder shanks;
d. means carried by said tool carrier plate to drive said chain circuits and said tool pockets to predetermined positions along the pitch lines of said chain circuits; and
e. means to alternately pivot said tool carrier plate from a first position to a second position and the reverse, to alternately present a constant point on each of said chain circuits to a tool pickup position defined on said planar surface.

2. The tool storage mechanism of claim 1, wherein said means carried by said tool carrier plate comprises a rotary motor connected to a gear train, wherein said gear train is in mesh with gears fixed to said driven shafts.

3. The tool storage mechanism of claim 1, wherein said means to alternately pivot said tool carrier plate comprises a piston and cylinder set, having their axes parallel to said planar surface, wherein said cylinder is clevis-mounted to a first block secured to said planar surface, and said piston is clevis mounted to a second block secured to said tool carrier plate, and further wherein said piston and cylinder are relatively movable under the influence of fluid pressure supplied to said cylinder.

4. The tool storage mechanism of claim 1, wherein said planar surface defines a horizontal plane on the top of said machine tool.

* * * * *